No. 726,099. PATENTED APR. 21, 1903.
J. C. POTTER & J. JOHNSTON.
SCROLL CHUCK.
APPLICATION FILED JUNE 20, 1900.
NO MODEL. 2 SHEETS—SHEET 1.

WITNESSES: INVENTORS:

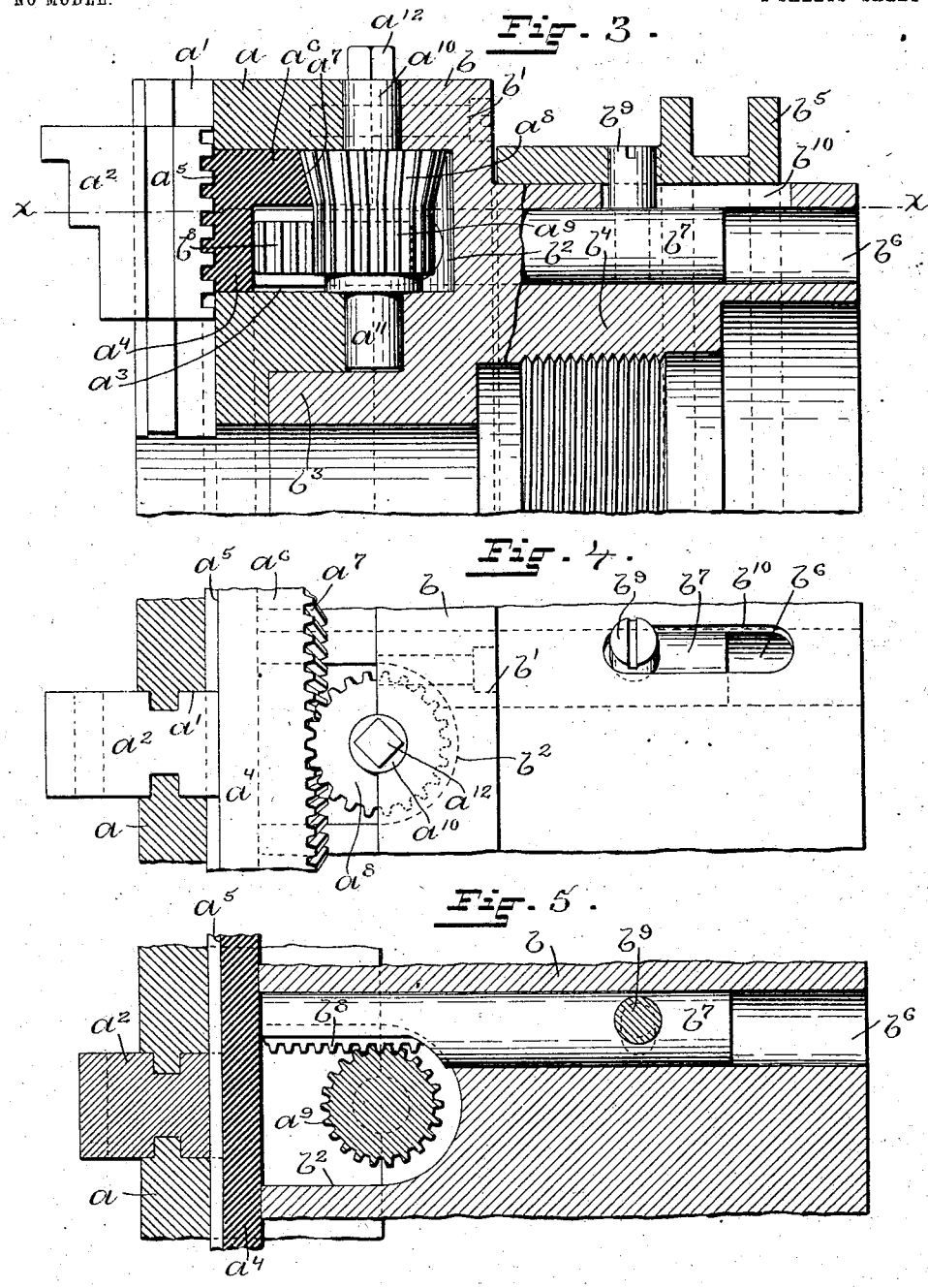

UNITED STATES PATENT OFFICE.

JAMES C. POTTER AND JOHN JOHNSTON, OF PAWTUCKET, RHODE ISLAND, ASSIGNORS TO POTTER & JOHNSTON MACHINE COMPANY, OF PAWTUCKET, RHODE ISLAND, A CORPORATION OF RHODE ISLAND.

SCROLL-CHUCK.

SPECIFICATION forming part of Letters Patent No. 726,099, dated April 21, 1903.

Application filed June 20, 1900. Serial No. 20,965. (No model.)

*To all whom it may concern:*

Be it known that we, JAMES C. POTTER, a citizen of the United States, and JOHN JOHNSTON, a subject of the King of Great Britain, residing at Pawtucket, in the county of Providence and State of Rhode Island, have invented a new and useful Improvement in Scroll-Chucks, of which the following is a specification.

This invention has reference to an improvement in chucks used on lathes and other machines to secure the work.

The invention is particularly applicable to spiral chucks in which the dogs are connected with a helically-grooved plate or ring.

The object of this invention is to provide a scroll-chuck with mechanism by which the dogs may be operated to clamp or release the work without diminishing or arresting the rotation of the chuck or the machine.

To this end the invention consists in the peculiar and novel construction and the combination of the parts whereby the dogs are simultaneously operated while the chuck continues to rotate, as will be more fully set forth hereinafter.

Figure 1:
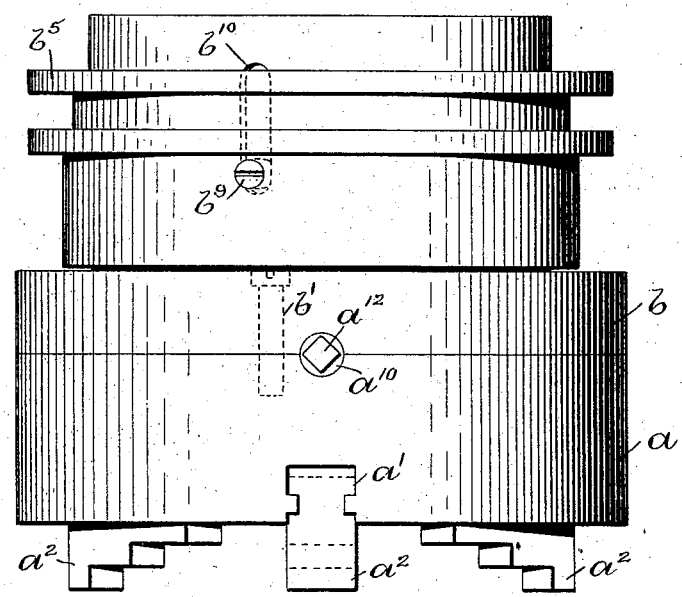
Figure 2:
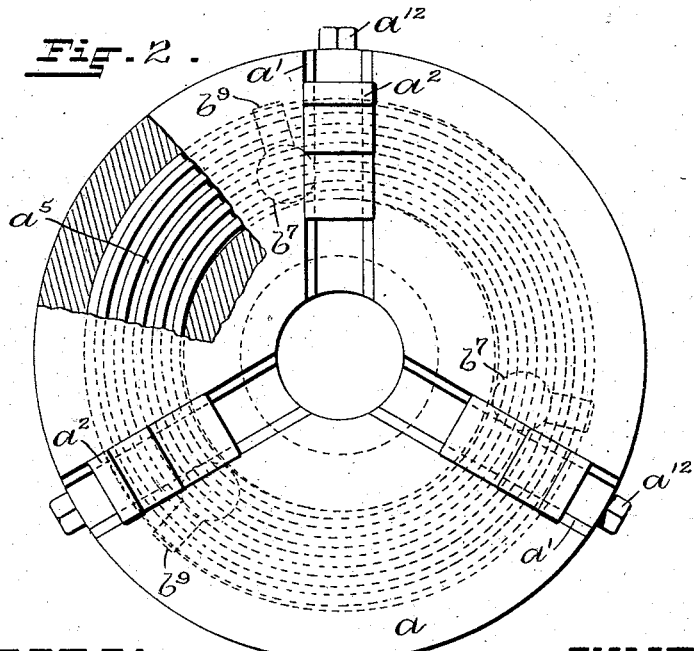

Figure 1 is a side view of our improved chuck. Fig. 2 is a front view of the chuck, shown partly in section. Fig. 3 is a sectional view on radial lines through the operating mechanism of one of the dogs by which the scroll-ring is operated while the chuck rotates. Fig. 4 is a side view, partly in section, of the parts shown in Fig. 3. Fig. 5 is a longitudinal sectional view on the line X X of Fig. 3.

Similar marks of reference indicate corresponding parts in all the figures.

In the drawings, $a$ indicates the front body of chuck, and $a'$ $a'$ radial ways in which the dogs $a^2$ $a^2$ are supported and made to slide toward and from the center of the chuck. In the annular groove $a^3$ in the front body $a$ of the chuck the ring $a^4$ is rotatably supported. The ring $a^4$ has on its vertical face the continuous helical grooves $a^5$, into which corresponding projections on the dog enter, as is shown in Fig. 3. The ring $a^4$ is of L-shaped cross-section, the member $a^6$ forming an annular flange, the inner edge of which is formed into the bevel-gear $a^7$. By rotating the ring $a^4$ in one direction the dogs $a^2$ $a^2$ are all moved in their ways toward the center of the chuck to grasp and hold the work, and when the ring $a^4$ is rotated in the opposite direction the dogs are moved away from the center to release the work, or vice versa.

The bevel-pinion $a^8$ engages with the bevel-gear $a^7$ on the annular rim of the ring $a^4$. The straight pinion $a^9$ is on the same shaft with the bevel-pinion and preferably made in one piece with the same. The journal-bearings $a^{10}$ and $a^{11}$ are journaled in bearings formed half in the front part $a$ and half in the rear part $b$ of the chuck. Three of these compound pinions are preferably used, and they are located, preferably, in the rear of each of the three dogs. They may, however, be located at other points of the circumferential surface of the chuck, and for some work a chuck having only one of the compound pinions may be constructed and practically used. The shafts of the compound pinions are each provided with the wrench-stud $a^{12}$.

The rear part $b$ of the chuck is secured to the front part $a$ by means of the screws $b'$ $b'$. The part $b$ has the recesses $b^2$ $b^2$ for the compound pinions. The forward-projecting annular flange $b^3$ forms a substantial support for the forward part $a$. The sleeve $b^4$ is internally screw-threaded to connect with the end of the arbor of the lathe or other machine. The sleeve $b^4$ extends over the arbor and forms the bearing of the shipper-sleeve $b^5$. In the body of the sleeve tangential to the pinion or pinions $a^9$ the hole or holes $b^6$ are made to form ways in which the rack-bars $b^7$ slide, the rack $b^8$ of which engages with the pinions $a^9$. The pin $b^9$ extends through the slot $b^{10}$ and connects the bar $b^7$ with the shipper-sleeve $b^5$.

In the drawings the parts are shown in the positions they occupy when the work is clamped by the dogs. When now the work is to be released, the shipper-sleeve $b^5$ is operated by the usual shipper-lever to slide the rack bar or bars $b^7$ rearward. The rack $b^8$ rotates the pinion $a^9$ and with it the bevel-pinion $a^8$, which being engaged with the bevel-gear $a^7$ on the ring $a^4$ rotates the ring and by means of the helical grooves on the face of the ring $a^4$ in engagement with the grooved back of the dogs moves the dogs $a^2$ simultaneously away from the work sufficiently to release the work without stopping the chuck. The reverse movement of the shipper-sleeve returns the rack-bars $b^7$ to the position shown in the drawings, and in so doing operates the ring $a^4$, through the compound pinions, to force the dogs against the work without stopping the rotation of the chuck.

By the construction herein shown and described all the parts are readily accessible by separating the front part $a$ from the rear part $b$ of the chuck, and all the operative parts are firmly supported on the rear part of the chuck, which is secured on the arbor of the machine.

Our improved chuck combines the facility of securing and releasing the work, while the chuck rotates with structural strength and clamping power.

Having thus described our invention, we claim as new and desire to secure by Letters Patent—

1. In a chuck, the combination of a part having helical grooves, dogs engaging with said grooves, an annular gear on said part, a rack-bar sliding in ways parallel with the axial center of the chuck, a pinion engaging with the rack-bar, a pinion fixed to the first pinion engaging with said annular gear of the helically-grooved part, and means for operating the rack-bar, whereby the dogs may be operated to clamp or release the work.

2. In a chuck, the combination of a body having guideways, dogs in the latter, a ring mounted on the head having helical grooves on one face to engage grooves in the backs of the dogs, and on its opposite face having a circular rack, a shaft mounted on the head having two pinions, one of which engages said circular rack, and a straight rack sliding in a way in the head parallel to the chuck-axis.

3. In a chuck, the combination of dogs mounted in radial ways and having grooves in their backs, a ring having helical grooves that engage with the dogs, a bevel-gear on the ring, a plurality of bevel-pinions engaging with the gear on the ring, a spur-gear pinion fixed to each of the bevel-pinions, a rack-bar in engagement with each spur-gear pinion, and a shipper-sleeve connected with all of the rack-bars whereby power is transmitted through the rack-bars and pinions to the helically-grooved ring at a plurality of points to actuate the dogs.

4. In a chuck, the combination of a scroll for operating the jaws, a circular rack attached to said scroll, a pinion for operating said circular rack, a straight rack for operating said pinion, and a shipper-sleeve connected to said straight rack, said racks and pinions being entirely inclosed, substantially as and for the purpose described.

In testimony whereof we have signed our names to this specification in the presence of two subscribing witnesses.

JAMES C. POTTER.
JOHN JOHNSTON.

Witnesses:
J. A. MILLER, Jr.,
A. E. HAGERTY.